Patented Oct. 9, 1923.

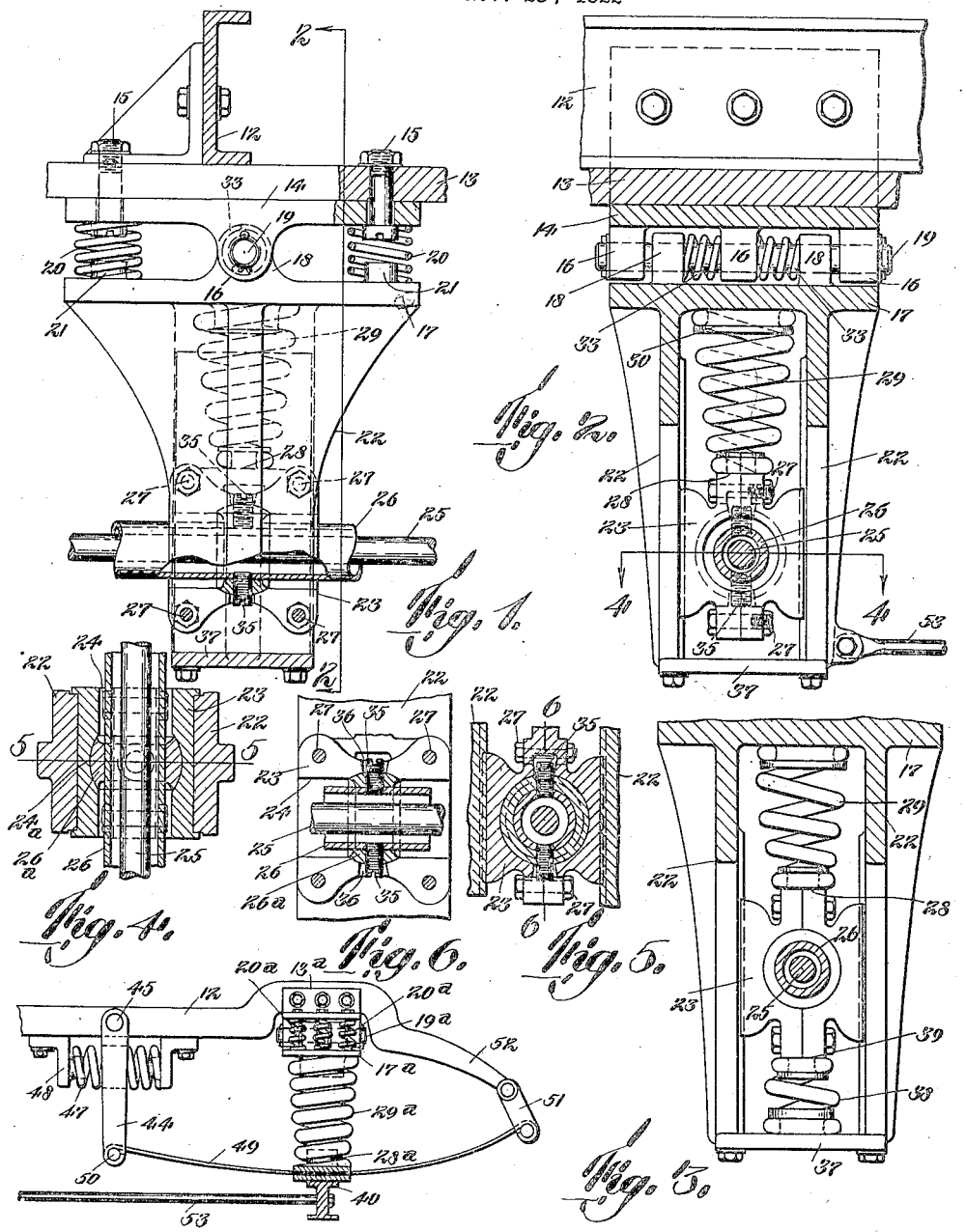

1,470,171

UNITED STATES PATENT OFFICE.

HERBERT C. KNIGHT, OF LYNN, MASSACHUSETTS.

LOAD-SUPPORTING MEANS FOR MOTOR VEHICLES.

Application filed November 23, 1922. Serial No. 602,725.

*To all whom it may concern:*

Be it known that I, HERBERT C. KNIGHT, a citizen of the United States, residing at Lynn, in the county of Essex and State of Massachusetts, have invented new and useful Improvements in Load-Supporting Means for Motor Vehicles, of which the following is a specification.

This invention is embodied in improved means interposed between an axle and the chassis of a motor vehicle, for yieldingly supporting the chassis and its load, the nature of the said improved means, and the objects thereof being hereinafter described, and the novel features being pointed out in the appended claims.

Of the accompanying drawings forming a part of this specification,—

Figure 1 shows in transverse section, one of the longitudinal frame members of a motor vehicle chassis, a portion of one of the transverse frame members, a portion of a rear axle which includes a housing member and a drive shaft, and supporting means cooperating with the chassis frame and the rear axle, parts being shown in section, and other parts in elevation.

Figure 2 is a section on line 2—2 of Figure 1.

Figure 3 is a view similar to portions of Figure 2, showing an additional load-supporting spring.

Figure 4 is a section on line 4—4 of Figure 2.

Figure 5 is a section on line 5—5 of Figure 4.

Figure 6 is a section on line 6—6 of Figure 5.

Figure 7 shows in transverse section the forward axle of a motor vehicle, and in side elevation a portion of one of the longitudinal frame members of a motor vehicle chassis and supporting means embodying certain features of the invention associated with the axle and chassis.

Figure 8 is a longitudinal section of the hinge shown in elevation by Figure 7.

The same reference characters indicate the same parts in all the figures.

Referring first to Figures 1 to 6, inclusive, 12 represents one of the longitudinal frame members of a motor vehicle chassis, and 13 represents a transverse frame member, connecting two longitudinal members.

14 represents a head rigidly secured as by bolts 15, to the frame member 13, and provided with downwardly projecting hinge socket members 16. 17 represents an upper abutment for the load-supporting spring hereinafter described. Said abutment is provided with upwardly projecting hinge socket members 18, alternating with the members 16, as shown by Figure 2. 19 represents a pintle engaged with the socket members 16 and 18, and constituting therewith a horizontal hinge whose axis extends lengthwise of the chassis, so that the abutment 17 is adapted to oscillate crosswise of the chassis.

Interposed between the head 14 and abutment 17, at opposite sides of the pintle 19, are vertically acting buffer springs 20, normally maintaining the abutment at the center of its oscillating movement, and parallel with the head, as shown by Figure 1, said springs being secured by means such as the heads of the bolts 15, and studs 21, on the abutment.

Fixed to and projecting downward from the abutment 17 are parallel vertical arms or guides 22. Slidable vertically in said guides is a box 23, having a horizontal bore 24, through which extends the rear axle. Said axle includes the usual drive shaft 25, and housing member 26. The box 23, which is preferably composed of complemental sections separably connected by bolts 27, carries a lower spring abutment 28, preferably formed by coinciding ears or projections on the box sections, collectively forming a stud adapted to support and laterally confine the lower end of a helical load-supporting spring 29.

The upper end of said spring bears on the upper abutment 17, and is laterally confined by means such as a flanged projection or stud 30 (Figure 2) on said abutment.

As shown by Figure 2, the hinge socket members 16 and 18 are preferably spaced apart, to permit a limited sliding movement of the upper abutment in the direction of the axis of the pintle 19, and lengthwise of the chassis, so that the upper abutment and the parts below it, are free to move forward and backward relative to the chassis to a limited extent. To yieldingly maintain the abutment between the extremes of said movement, I provide end thrust-absorbing springs 33, supported by the pintle and interposed between adjacent socket members 16 and 18.

The diameter of the box bore 24 is considerably greater than that of the housing member 26. Said bore has an annular enlargement 24ª, forming a zone of a spherical socket. The housing member 26 has an annular enlargement 26ª, forming a zone of a spherical ball, fitting and movable in the bore enlargement 24ª, said enlargement 26ª being preferably a metal ring shrunk upon the housing member. Provision is thus made for permitting relative movements of the box and the housing member on a center which is the center of the ball and socket joint, formed by the enlargements 24ª and 26ª. To limit said relative movements and prevent rotation of the housing member by the torque of the drive shaft 25, I provide stop parts, preferably embodied in radial studs 35, fixed to the enlargement 26ª, and openings 36 on the box, loosely receiving said studs. The lower ends of the guides 22 are connected by a cross-bar or plate 37, adapted to limit upward movement of the guides relative to the box, or as shown by Figure 3, to constitute a lower abutment for an auxiliary spring 38, the box being provided with an upper abutment 39 for said spring.

Figures 7 and 8 show an upper abutment 17ª, adapted to oscillate crosswise of the chassis, by a horizontal hinge similar to that employed in connection with the abutment 17, and provided by a head 13ª, fixed to the chassis, hinge socket members 16ª and 18ª formed respectively on the head and on the upper abutment, and a pintle 19ª. In this embodiment of the invention, buffer springs 20ª corresponding to the springs 20, are employed, and the end thrust-absorbing springs 33, the guides 22, and the box, are omitted, the load spring 29ª being interposed between the abutment 17ª and a lower abutment 28ª, fixed to a forward axle 40. To laterally support the spring 29ª against extreme forward and rearward displacement, as when the front wheels contact forcibly with an obstructon, such as a curb, I provide means, preferably embodied in a pendulous arm 44, pivoted at 45 to the side member 12, a pair of oppositely acting buffer springs 47, interposed between the lever 44 and fixed abutments 48, on the member 12, and a member 49, pivoted at 50 to the arm 44, and fixed to the axle 40. The member 49, which may be a strip of spring metal connected at one end by a link 51 with an arm 52 on the member 12, serves to transmit pressure between the buffer springs 47 and the abutment 28ª. The axle 40 and the frame which includes the guides 22, may be coupled together by a tie-rod 53 (Figures 2 and 7).

Each of the described embodiments of the invention includes a head fixed to the chassis, an upper load spring abutment, connected with the head by a horizontal hinge, and adapted to oscillate crosswise of the chassis, side springs normally maintaining the upper abutment between the extremes of its oscillating movement, and a vertically acting load spring, interposed between the upper abutment and a lower abutment carried by an axle.

This structure greatly relieves side, backward, and forward thrusts, and prevents injurious strains due to sudden shocks. The load spring is required only to perform the function of yieldingly supporting the load, and is not required to retain an unvarying relative position between the chassis and the axle, the strain caused by the torque of the engine being taken up or resisted by means other than the load spring, instead of being imposed on said spring, the resilience of which is therefore utilized wholly in supporting the load.

My invention renders practical the employment of the two universal joint constructions now coming into extensive use, by preventing severe strain on the joint between the drive-shaft housing and the differential housing.

My inventon entirely eliminates the usual multiple leaf spring as the load spring, and the necessity of oiling to prevent squeaking of the load spring.

My invention adds much to the easy riding qualities of a motor vehicle equipped therewith, and will greatly prolong the life of the vehicle, especially in the case of a heavy truck.

I claim:

1. In a motor vehicle, in combination, a head secured to the chassis; an oscillatory upper abutment; a horizontal hinge connecting the said abutment with the head and arranged to permit the abutment to oscillate crosswise of the chassis; vertically acting buffer springs interposed between the said head and abutment at opposite sides of the hinge axis, and normally maintaining the abutment at the center of its oscillating movement; an axle; a lower abutment secured to the axle; and a vertically acting load spring interposed between said abutments.

2. In a motor vehicle, in combination, a head secured to the chassis; an oscillatory upper abutment; a horizontal hinge connecting the said abutment with the head and arranged to permit the abutment to oscillate crosswise of the chassis; vertically acting buffer springs interposed between the said head and abutment at opposite sides of the hinge axis, and normally maintaining the abutment at the center of its oscillating movement; parallel guides fixed to and projecting downward from the upper abutment; a box slidably engaged with said guides; a rear axle including a housing member extending through and secured to said box; a lower spring abutment carried by the box; and a vertically acting load spring interposed between said abutments.

3. In a motor vehicle, in combination, a head secured to the chassis; an oscillatory upper abutment; a horizontal hinge connecting the said abutment with the head and arranged to permit the abutment to oscillate crosswise of the chassis; vertically acting buffer springs interposed between the said head and abutment at opposite sides of the hinge axis, and normally maintaining the abutment at the center of its oscillating movement; parallel guides fixed to and projecting downward from the upper abutment; a box slidably engaged with said guides; and provided with a bore having an annular enlargement forming a zone of a spherical socket; a rear axle including a housing member extending through and of smaller diameter than said bore, and having an annular enlargement forming a zone of a spherical ball fitting and movable in the bore enlargement, so that a ball and socket joint is provided, permitting relative movements of the box and the housing member; a lower spring abutment carried by said box; and a vertically acting load spring interposed between said abutments.

4. In a motor vehicle, in combination, a head secured to the chassis; an oscillatory upper abutment; a horizontal hinge connecting the said abutment with the head and arranged to permit the abutment to oscillate crosswise of the chassis; vertically acting buffer springs interposed between the said head and abutment at opposite sides of the hinge axle, and normally maintaining the abutment at the center of its oscillating movement; parallel guides fixed to and projecting downward from the upper abutment; a box slidably engaged with said guides; and provided with a bore having an annular enlargement forming a zone of a spherical socket; a rear axle including a housing member extending through and of smaller diameter than said bore, and having an annular enlargement forming a zone of a spherical ball fitting and movable in the bore enlargement, so that a ball and socket joint is provided, permitting relative movements of the box and the housing member; a lower spring abutment carried by said box; and a vertically acting load spring interposed between said abutments, the housing member and the box enlargement being provided with complemental stop parts, adapted to limit said relative movements.

5. In a motor vehicle, in combination, a head secured to the chassis, and provided with downwardly projecting hinge socket members; an oscillatory upper abutment having upwardly projecting hinge socket members; a pintle engaged with the said socket members and constituting therewith a horizontal hinge whose axis extends lengthwise of the chassis, so that the upper abutment is adapted to oscillate crosswise of the chassis; vertically acting buffer springs interposed between the said head and upper abutment at opposite sides of the pintle, and normally maintaining said abutment at the center of its oscillating movement, said socket members being spaced apart, to permit a limited sliding movement of the upper abutment in the direction of the axis of the pintle; end thrust-absorbing springs mounted on said pintle between hinge sockets on said head and upper abutment; parallel guides fixed to and projecting downward from the upper abutment; a box slidably engaged with said guides; a rear axle including a housing member extending through and secured to said box; a lower spring abutment carried by the box; and a vertically acting load spring interposed between said abutments.

In testimony whereof I have affixed my signature.

HERBERT C. KNIGHT.